United States Patent [19]

Impink, Jr. et al.

[11] Patent Number: 4,588,547
[45] Date of Patent: May 13, 1986

[54] METHOD AND APPARATUS FOR DETERMINING THE NEARNESS TO CRITICALITY OF A NUCLEAR REACTOR

[75] Inventors: Albert J. Impink, Jr., Murrysville; Francis L. Langford, Jr., Forest Hills, both of Pa.

[73] Assignee: Westinghouse Electric Corp., Pittsburgh, Pa.

[21] Appl. No.: 540,073

[22] Filed: Oct. 7, 1983

[51] Int. Cl.⁴ .............................................. G21C 17/00
[52] U.S. Cl. ................................... 376/254; 376/214; 376/257
[58] Field of Search ............... 376/214, 215, 254, 255, 376/257

[56] References Cited

U.S. PATENT DOCUMENTS

| | | | |
|---|---|---|---|
| 2,931,761 | 4/1960 | Hurwitz, Jr. | 376/215 |
| 2,936,274 | 5/1960 | Dessauer | 376/257 |
| 3,079,315 | 2/1963 | LeBaud et al. | 376/215 |
| 3,930,936 | 1/1976 | Aleite et al. | 376/254 |
| 4,069,097 | 1/1978 | Frank | 376/254 |
| 4,079,236 | 3/1978 | Graham et al. | 376/255 |
| 4,305,786 | 12/1981 | Schultz | 376/254 |
| 4,510,117 | 4/1985 | Philips et al. | 376/254 |

Primary Examiner—Salvatore Cangialosi
Attorney, Agent, or Firm—Daniel C. Abeles

[57] ABSTRACT

The approach to criticality of a nuclear reactor provided with an artificial neutron source is monitored by two neutron detectors, one which measures the neutron flux in a localized region around the artificial neutron source, and the other located simlarly with respect to the core geometry but removed from the localized region. When the reactor is subcritical, the artificial source dominates and the outputs of the two detectors are noticeably different. As the reactor approaches criticality, the critical mode distribution of neutrons, which is symmetrical with respect to the two detectors, becomes dominant and the detector outputs approach each other in magnitude. The ratio of the output signals therefore, provides an indication of the reactor reactivity state. Either linear or logarithmic ratio signals can be generated, and if desired, either can be compared with an appropriately scaled reference signal representative of a selected reactivity state, such as a multiplication factor of 0.99, with the result of the comparison used to control a "near-criticality/not near-criticality" logic output.

15 Claims, 7 Drawing Figures

METHOD AND APPARATUS FOR DETERMINING THE NEARNESS TO CRITICALITY OF A NUCLEAR REACTOR

BACKGROUND OF THE INVENTION

1. Field of the Invention

This invention relates to a method and apparatus for monitoring the approach to criticality of the core of a light water moderated nuclear reactor which is provided with a localized artificial neutron source.

2. Description of the Prior Art

In general terms, a nuclear reactor contains a mass of fissionable material arranged in the reactor core to produce controlled fission reactions. The fission reactions occur when free neutrons at the proper energy level strike the atoms of the fissionable material resulting in the release of large amounts of heat energy which are extracted from the core in the reactor coolant and in the release of additional free neutrons which are available to produce more fission reactions. Some of these released neutrons escape or are absorbed by neutron absorbers within the core and therefore do not cause additional fission reactions. By controlling the amount of neutron absorbant material present in the core, the rate of fission can be controlled. There are always random fission reactions occurring in the fissionable material but when the core is shutdown the released neutrons are absorbed at such a high rate that a sustained series of reactions does not occur. By reducing the neutron absorbant material until the number of neutrons in a given generation equals the number of neutrons in the previous generation, the process becomes a self-sustaining chain reaction and the reactor is said to be critical. When the reactor is critical, the neutron flux is six or so orders of magnitude higher than when the core is shutdown. In order to accelerate the increase in the neutron flux in the shutdown core to achieve practical transition intervals, an artificial neutron source is implanted in the reactor core among the fuel cells containing the fissionable material. This artificial neutron source creates a localized increase in the neutron flux to aid in bringing the reactor up to power.

In the absence of a neutron source, the ratio of the number of free neutrons in one generation to those in the previous generation is referred to as the multiplication factor, K, and is used as a measure of the reactivity of the reactor core. Thus when the reactor is critical, K is equal to one and K remains equal to one over the full power range of the reactor. The increase in the neutron population as the reactor goes from subcritical to critical is not a linear function but rises approximately exponentially as a K 1 is approached. Thus, for practical reasons, a K of 0.99 been recognized as significant, and in fact regulations stipulate that certain actions can be taken on a shutdown reactor only when the multiplication factor is below this value.

It is therefore evident that it is very desirable to have a means for determining when the multiplication factor of a nuclear reactor is above and when it is below 0.99. However, presently it is difficult to accurately determine the K value on an on-line basis. Under current practice, the reactivity of a shutdown reactor is determined as a function of the inverse count rate ratio. The count rate is a measure of the reactor neutron flux expressed as a function of the number of neutrons detected by a neutron detector in a unit time period. The count rate for the latest unit time period is divided into the count rate for a reference time period to generate the inverse count rate ratio. The inverse ratio is used since it will approach zero as the reactor approaches criticality. If the direct count rate ratio were used instead, the ratio would get very large as criticality was approached, but the large number is relative and does not provide a meaningful statement of the reactivity of the core. Even the inverse count rate ratio is not very accurate since it depends upon the reference time period selected. While an operator can gain a feel for the approach to criticality by observing the rate at which the inverse count rate approaches zero, even this technique loses its value if the increase in reactivity is levelled off for any reason subsequent to the reference time period and then resumed. As a result, the regulators and operators tend to be very conservative with regard to the approach to criticality since with the current practice there is no accurate on-line system for determining the shutdown margin of the reactor when the multiplication factor is in the neighborhood of 0.99.

Accordingly, it is the primary object of this invention to generate an accurate on-line indication of the reactivity of a nuclear reactor as criticality is approached.

SUMMARY OF THE INVENTION

This primary object of the invention, and others, are realized by taking advantage of the fact that when the reactor is subcritical, the neutron flux generated by the artificial neutron source, and the direct progeny by fission of the source neutrons, is noticeably higher than that generated by neutrons from the natural neutron sources in the reactor fuel and the progeny of those neutrons. However, the relatively high neutron flux attributable to the presence of the artificial neutron source is confined to a localized space surrounding the source, so that the difference in neutron flux level can be detected by comparing the output of a neutron detector monitoring the flux field surrounding the artificial source with a detector which measures the flux of another part of the core uninfluenced by the artificial source. On the other hand, when the reactor is near-critical, the critical flux density pattern generated by the reactor fuel dominates over that generated by the artificial source and the two detectors, which are similarly situated with respect to the reactor fuel, will have similar readings. This transition from the source dominated mode to the critical mode begins to become clearly detectable with presently used excore instrumentation when the multiplication factor reaches about 0.99. Hence, as the reactivity of the core approaches a K of 0.99, the ratio of the readings of the two detectors will be noticeably increasing. When the ratio becomes equal to one, the core is critical. The exact ratio of the two detector readings for a K value of 0.99 can be determined experimentally but would be expected to be in the range of 0.1 to 0.4.

For a simple straightforward indication of whether the multiplication factor is above or below 0.99, the measured ratio at any time can be compared with the experimentally determined expected ratio for 0.99 and an appropriate signal generated when the ratio is below the expected ratio and another appropriate signal when it is above. By using the logarithmic values of the two count rates, increased sensitivity is achieved in the vicinity of $K=0.99$, a less abrupt change in the value of the output parameter is experienced as criticality is approached and from a human engineering standpoint, an improved reading is presented which is negative for a subcritical reactor and reaches zero when the reactor goes critical.

BRIEF DESCRIPTION OF THE DRAWINGS

A fuller understanding of the invention can be gained by the following description taken in conjunction with the accompanying drawings in which.

DESCRIPTION OF THE PREFERRED EMBODIMENT

Figure 1:
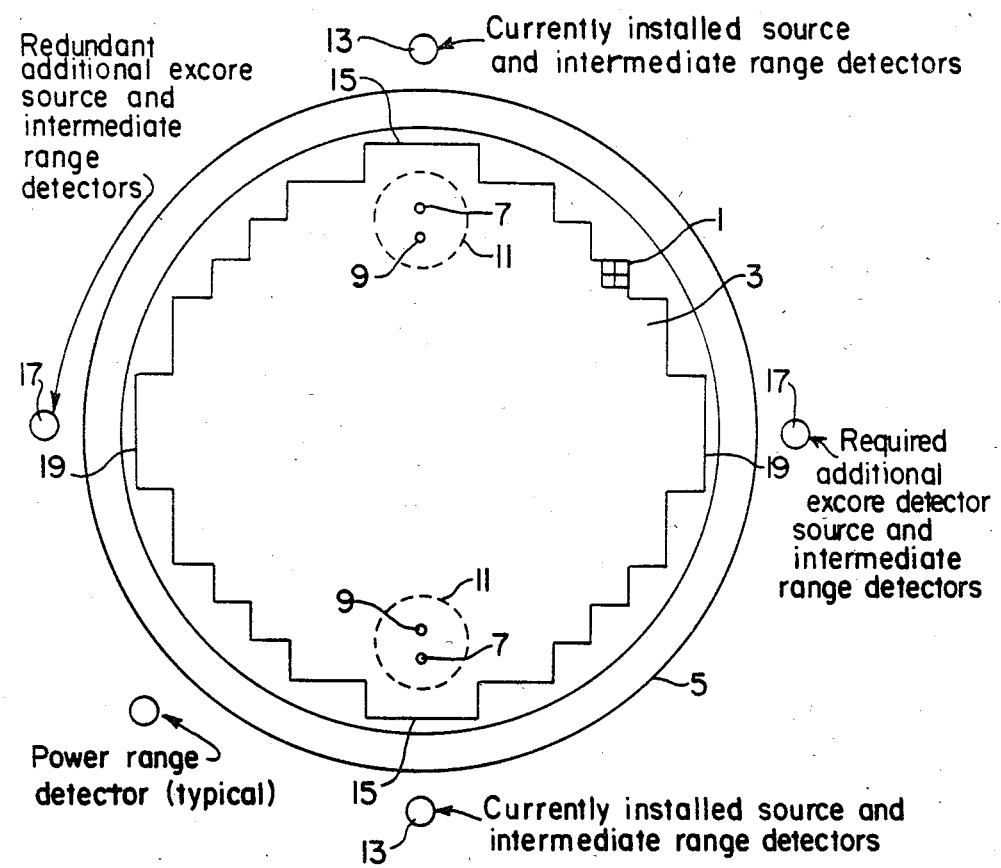
FIG. 1 is a horizontal cross-section view through a nuclear reactor incorporating the invention.

The invention will be described as being applied to a pressurized water reactor (PWR) but it is equally applicable to other types of reactors such as boiling water reactors (BWR) or any other nuclear reactor that is provided with an artificial neutron source and with moderators that confine the neutron flux generated by the artificial neutron source to a localized region of the reactor in the vicinity of the source. FIG. 1 illustrates a PWR in which fissionable material is contained in hundreds of elongated rectangular fuel assemblies, such as those shown at 1, arranged in a generally rectangular pattern to form the reactor core 3 which is contained in a reactor vessel 5. Fission reactions within the natural neutron sources within the reactor fuel generate heat which is removed from the core by reactor coolant (water in the case of the PWR) which is circulated through the core and through steam generators which extract the heat from the reactor coolant to generate steam which drives an electric power generating turbine—generator combination. The reactivity within the core 3 is controlled by control rods (not shown) of neutron absorbing material which are inserted and withdrawn from between the fuel assemblies and by adjusting the concentration of boron dissolved in the reactor coolant.

In order to provide a source of neutrons to respond to the increase in reactivity of the fissionable material in the reactor fuel necessary to cause the reactor to go critical, an artificial neutron source is implanted in the core. Actually two artificial neutron sources are used with both being implanted in rods which are inserted within the fuel assemblies. The primary source 7 is a spontaneously fissionable material such as californium 252 which provides neutrons of the appropriate energy levels to initiate fission reactions in the reactor fuel surrounding the primary source 7. Alternatively, plutonium-beryllium or curium-beryllium mixtures can be used as the primary source. In these alternate primary sources, the plutonium or curium emits alpha particles which release neutrons from the beryllium.

The primary source provides the artificial neutron source during startup of the nuclear reactor and for sometime thereafter until it decays to the point where it generates an insufficient neutron flux to be effective. To provide an artificial neutron source for the remaining years of life of the reactor, a secondary source 9 is also implanted in the core. This secondary source does not produce a spontaneous source of neutrons initially but becomes activated by the neutron flux generated by the reactor fuel while the reactor is at power during the first few months of operation. Typically, the secondary source is an antimony-beryllium mixture in which antimony 123 is transmuted to antimony 124 which in turn decays to antimony 125. The antimony 125 emits gamma rays which release neutrons from the beryllium. It is present in sufficient quantity to be effective as an artificial neutron source after a few weeks of operation of the reactor at power and is fully effective after about six months. The neutrons generated by the source, whether primary or secondary, dominate over those generated in the reactor fuel of a fully shutdown core.

Figure 2:
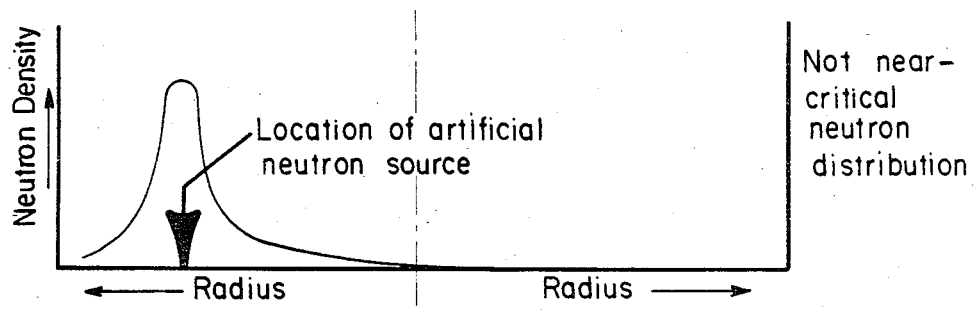
FIG. 2 is a schematic diagram of the radial neutron distribution of the nuclear reactor of FIG. 1 when the reactor core is subcritical.
Figure 3:
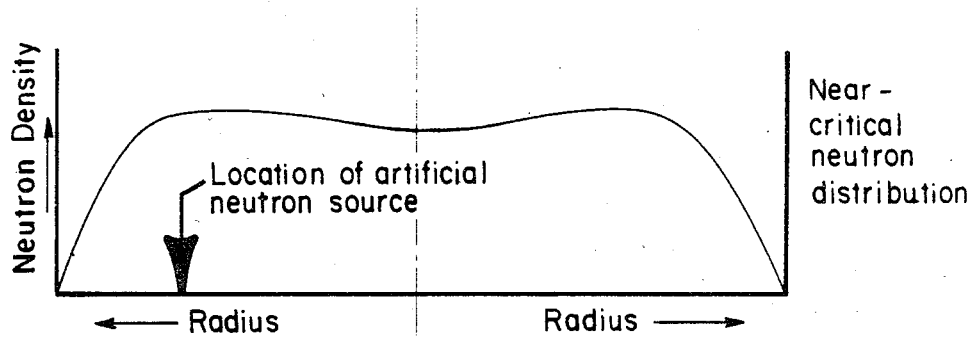
FIG. 3 is a schematic diagram of the radial neutron distribution of the nuclear reactor of FIG. 1 when the reactor core is critical or near-critical.

Nuclear reactor theory, supplemented by extensive operating experience, indicates that the spatial distribution of neutrons in a large light water moderated power reactor core changes dramatically in passing from the artificial source dominated mode to the critical mode. Typical one dimensional (radial) distributions found in the two conditions are illustrated in FIGS. 2 and 3. As seen in FIG. 2, the neutron flux in a shutdown reactor is concentrated around the location of the artificial neutron source. In fact, the volume 11 in which nearly all the neutrons occur in a source dominated distribution is rather small. Very few neutrons are found more than 25 to 30 centimeters in any direction from the source in a shutdown core. In the critical mode illustrated in FIG. 3, the neutrons from the reactor fuel, which is distributed throughout the reactor core, dominate and a symmetrical distribution pattern is generated. The density of the distributed neutrons in the critical mode is so much greater than that of the artificial source that the latter has no noticeable affect on the neutron distribution pattern (the ordinate scale in FIG. 3 is several orders of magnitude greater than that in FIG. 2). The transition from the source dominated distribution of neutrons to the critical mode distribution begins to become clearly detectable with presently used excore instrumentation when the effective multiplication factor, $K_{eff}$, reaches about 0.99. Hence, monitoring the transition from the source dominated mode to the critical mode of neutron distribution can be an effective, positive means of determining, with a high level of confidence previously unachievable, when the reactivity of the reactor is above or below 0.99. It should be noted that for shutdown monitoring purposes, observation that the neutron distribution is not in the source dominated mode is probably as meaningful as explicit determination that $K_{eff}$ exceeds 0.99 in terms of indicating impending or already established criticality.

Thus, a "near-critical/not near-critical" indication can be obtained by monitoring and comparing the signals from two similar neutron detectors. The locations of the detectors must be such that one detector responds to neutrons emitted from the vicinity of the localized artificial neutron source in the core, while the other detector sees only neutrons emitted from a region of the core in which no localized artificial neutron source exists. If the core is critical or close to critical and the detector-core geometries are similar for the two detectors, the two signals will be of comparable magnitude. If the core is definitely subcritical, the signal from the detector surveying the sourceless region will be significantly weaker than the signal from the detector monitoring the source driven region. Comparison of the two signals provides a basis for distinguishing "near criticality" from "not near-criticality" as required by core surveillance or core protection systems.

An arrangement of the detectors for carrying out the invention is shown in FIG. 1. First, though, it should be explained, that it is sometimes desirable to use three different types of neutron flux detectors and associated electronics to monitor the neutron flux in the reactor core since the monitored neutron flux varies by about eleven orders of magnitude from a fully shutdown core to a core operating at rated power. Alternatively, it is feasible to use a single type detector, typically a fission chamber, to cover the entire span of neutron flux level, provided specialized electronic channels and appropriate switching among channels are available to properly condition and process the detector signals in the several flux ranges. In the described arrangement, three types of flux level detectors with appropriate electronic circuitry are dedicated to covering the total flux level range. The source range detectors, which are typically boron lined or $BF_3$ chambers or fission chambers, measure the neutron flux density while the core is shutdown and as it goes critical. The intermediate range detectors, which are typically compensated ion chamber detectors, monitor the neutron flux as the core approaches criticality and into the power range. The power range detectors monitor the neutron flux throughout the power range. The operational range of the intermediate range detector overlaps that of both the source and power range detectors and typically two of each type of detector is provided for redundancy.

Referring again to FIG. 1, it is common practice to position the redundant source range and intermediate range detectors in excore thimbles 13 adjacent diametrically opposite core flats 15 where they can measure the neutron flux generated by the artificial neutron source as well as the neutron flux in the generally distributed reactor fuel. Since, as previously discussed, most of the neutrons from the artificial source remain within the rather small localized region around the source, the source neutrons detected by the excore detectors are among the very small fraction of the total population that, having been emitted as fast neutrons (usually as a result of fission) in this highly localized region, pass through the core and the vessel without experiencing a slowing down or absorption collision and are subsequently thermalized by scattering in the near vicinity of the detector. This relatively low source neutron density in the vicinity of the excore detectors is, however, much greater in a shutdown reactor than that generated by the remainder of the core such as by neutron-induced and spontaneous fission, alpha-neutron reactions in oxygen 18 in the fuel and the gamma-neutron reactions in the deuterium in the reactor coolant.

The additional source and intermediate range detectors required for this invention are placed in excore thimbles 17 adjacent core flats 19 where they are similarly located with respect to the reactor core geometry as the detectors in thimbles 13, but are not influenced at all by the artificial neutron sources 7 and 9. Again, two additional source and intermediate range detectors are included only to provide independent monitoring channels with the redundant detectors already available in the plant.

Figure 4:
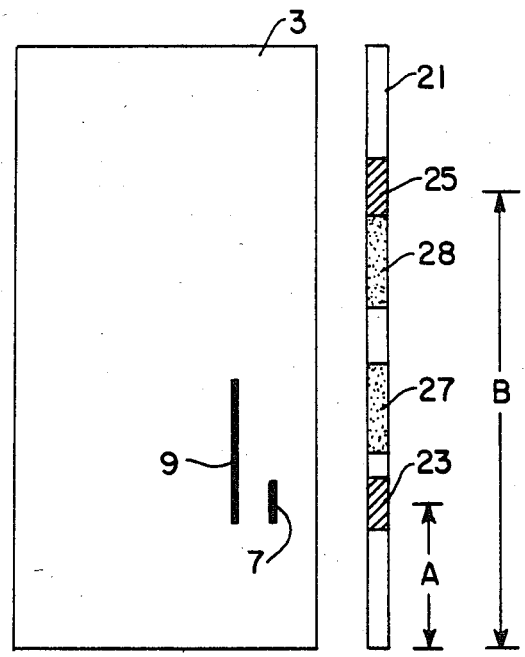
FIG. 4 is a vertical section through a nuclear reactor illustrating another embodiment of the invention.

As an alternative to angularly displacing the second detector from the first around the periphery of the core, the two detectors can be axially displaced within a single excore thimble 21 as illustrated in FIG. 4. This arrangement is possible because the artificial neutron sources only extend partially throughout the height of the reactor core. In fact, the primary source 7 occupies a very short section of a thimble about one-fourth of the way up from the bottom of the reactor core. The secondary source starts at about the same level but extends upward to a point somewhat below the middle of the core. The first source detector 23 is located in the excore thimble 21 at a distance A from the bottom of the core which is approximately one-fourth of the way up. Thus, the detector 23 is in a position where it responds to the neutrons generated by both artificial sources 7 and 9. The second source detector 25 is located in the same thimble 21 a distance B from the bottom which is about three-fourths of the way up where it responds to the neutrons generated by the reactor fuel in the core but is unaffected by the primary and secondary sources. Since the source detector 25 is about one-fourth of the way up from the bottom of the core and the detector 25 is the same distance down from the top, they are similarly placed with respect to the geometry of the core and therefore generate similar responses to neutrons from the reactor fuel. As shown in FIG. 4, a pair of intermediate range detectors can be placed in the thimble 21 between the two source detectors with one, 27, located below the midpoint where it responds to the neutron flux generated by the neutron sources and the other, 28, located an equal distance above the midpoint where it is uninfluenced by the artificial neutron sources.

Figure 5:
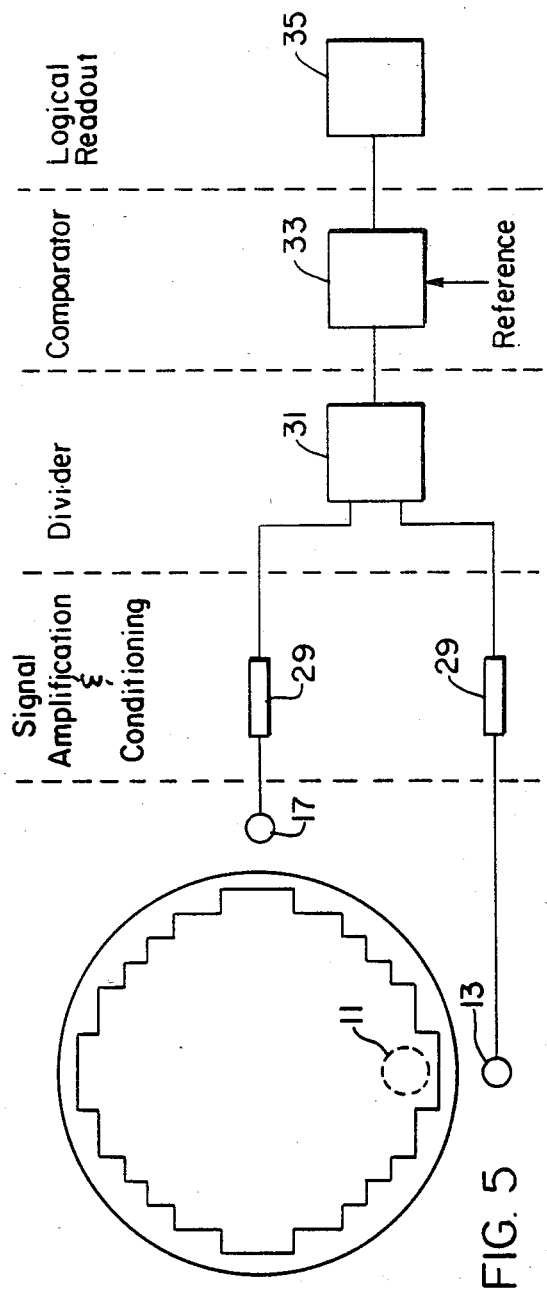
FIG. 5 is a schematic diagram mostly in block diagram form of circuitry suitable for carrying out the invention to generate a ratio output in linear form.

FIG. 5 illustrates suitable apparatus for carrying out the invention. The electrical signals generated by the detectors in thimbles 13 and 17 pass through amplifier and conditioning circuits 29 before being applied to a divider 31 which generates a signal representative of the ratio between the conditioned signals produced by the detectors. The conditioning circuits can include surge protection and isolation circuitry. In the case of source range detectors, they can further include discriminators which eliminate the responses of the very sensitive detectors to gamma rays, and if necessary, scaler timers which generate time averaged outputs from the statistically random responses experienced at very low levels of reactivity. The ratio signal generated by the divider 31 is compared in comparator 33 with a reference signal selected to be equal to the ratio signal generated at a predetermined reactivity level such as a multiplication factor of 0.99. When the ratio signal is less than the reference signal, the output of comparator 33 sets a logical output 35 to indicate that the reactivity is below the predetermined level. When the ratio signal is equal to or greater than the reference signal, the logical output is set to indicate that the reactivity is above the predetermined level. For instance, where the predetermined reactivity level is a $K_{eff}$ of about 0.99, the logical output can be an indication that the core is "not near-critical" when the ratio signal is less than the reference signal or that the core is "near-critical" otherwise. If desired, the logical output can also be used to initiate an automatic response, such as boration should the reactivity of a shutdown reactor approach the selected level with the trip breakers open.

Alternatively, definite benefits can be achieved if the data are handled logarithmically instead of linearly.

Since the output of the detectors is a voltage proportional to the neutron count rate, the ratio signal is generated as follows:

$$\text{ratio} = \frac{C * \text{Output voltage from detector 2}}{\text{Output voltage from detector 1}} \quad \text{(Equation 1)}$$

Where:
- detector 1 monitors the localized region of the core containing the artificial neutron source
- detector 2 monitors a region of the core removed from the artificial neutron sources
- C is a constant which accommodates for different detector sensitivities and possible electronic variations In logarithmic form, equation 1 becomes:

$$\log(\text{ratio}) = \log(c) + \log(\text{output voltage from detector 2}) - \log(\text{output from detector 1}) \quad \text{(Equation 2)}$$

In order to obtain acceptable statistics, it is necessary to accumulate some specific number of counts from the source range detectors. Since voltage is proportional to count rate, the voltage can be converted to current and integrated until, at a minimum, a preset value which is determined by statistical precision requirements is achieved. Thus, in lieu of equation 2:

$$\log(\text{ratio}) = \log C + \log\left(\int_0^t dt \text{ output current from detector 2}\right) - \log\left(\int_0^t dt \text{ output current from detector 1}\right) \quad \text{(Equation 3)}$$

From equation 3, it will be appreciated that, if the value of the constant C is selected such that the log (ratio) = 0.0 when the core is critical at a nuclear power level that is well above the source effects, the value of log (ratio) will be negative when the core is subcritical and will approach 0.0 from the negative side as criticality is approached.

Figure 6:
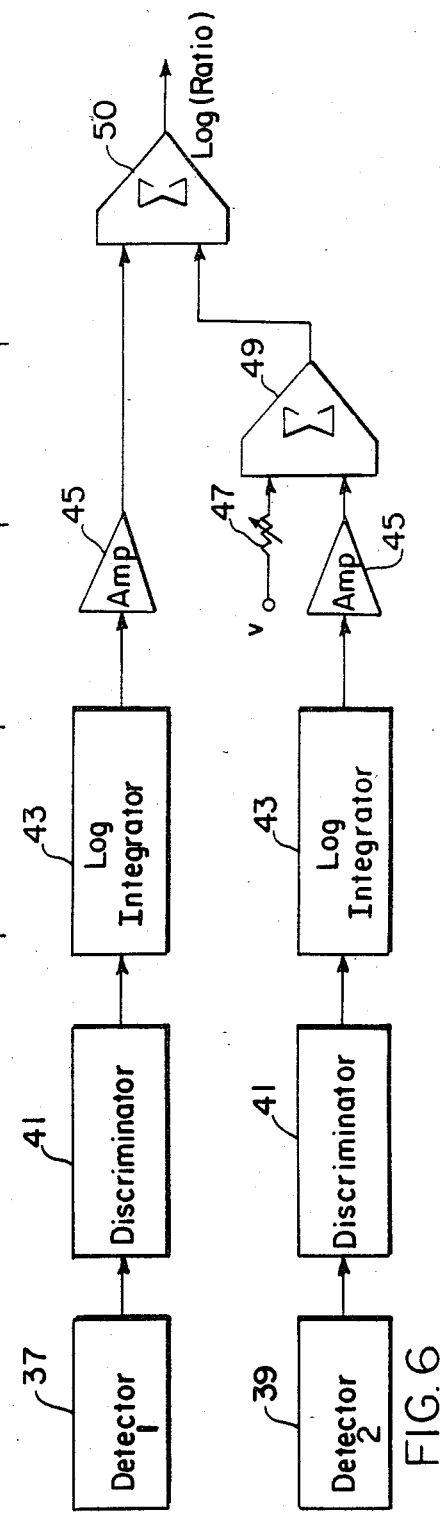
FIG. 6 is a schematic diagram in block diagram form of circuitry suitable for carrying out the invention to generate a ratio output in logarithmic form.

FIG. 6 illustrates schematically a circuit suitable for carrying out the function expressed by equation 3. The outputs from the first and second detectors 37 and 39 respectively are applied to discriminators 41 which as previously mentioned, eliminate detector responses attributable to gamma rays. The detector responses caused by neutrons are applied to log integrators 43 and amplified by operational amplifiers 45. The integrated log signal from detector 2 is added in summer 49 to a current which is set to represent the constant log (C) by potentiometer 47. The output of summer 49 is added to the integrated log signal from the first detector in a second summer 50 to generate the log (ratio) signal. Since the summers invert the applied signals, the proper arithmetic is carried out by the circuit and the log (ratio) signal is negative while the core is subcritical. While the log (ratio) signal could be applied to a comparator to generate a logical "not near-critical/near-critical" output, it can also be used, as can the linear output of the divider in the circuit of FIG. 5, to generate a ratio readout which can be interpreted by the operator to determine the criticality of the core.

Figure 7:
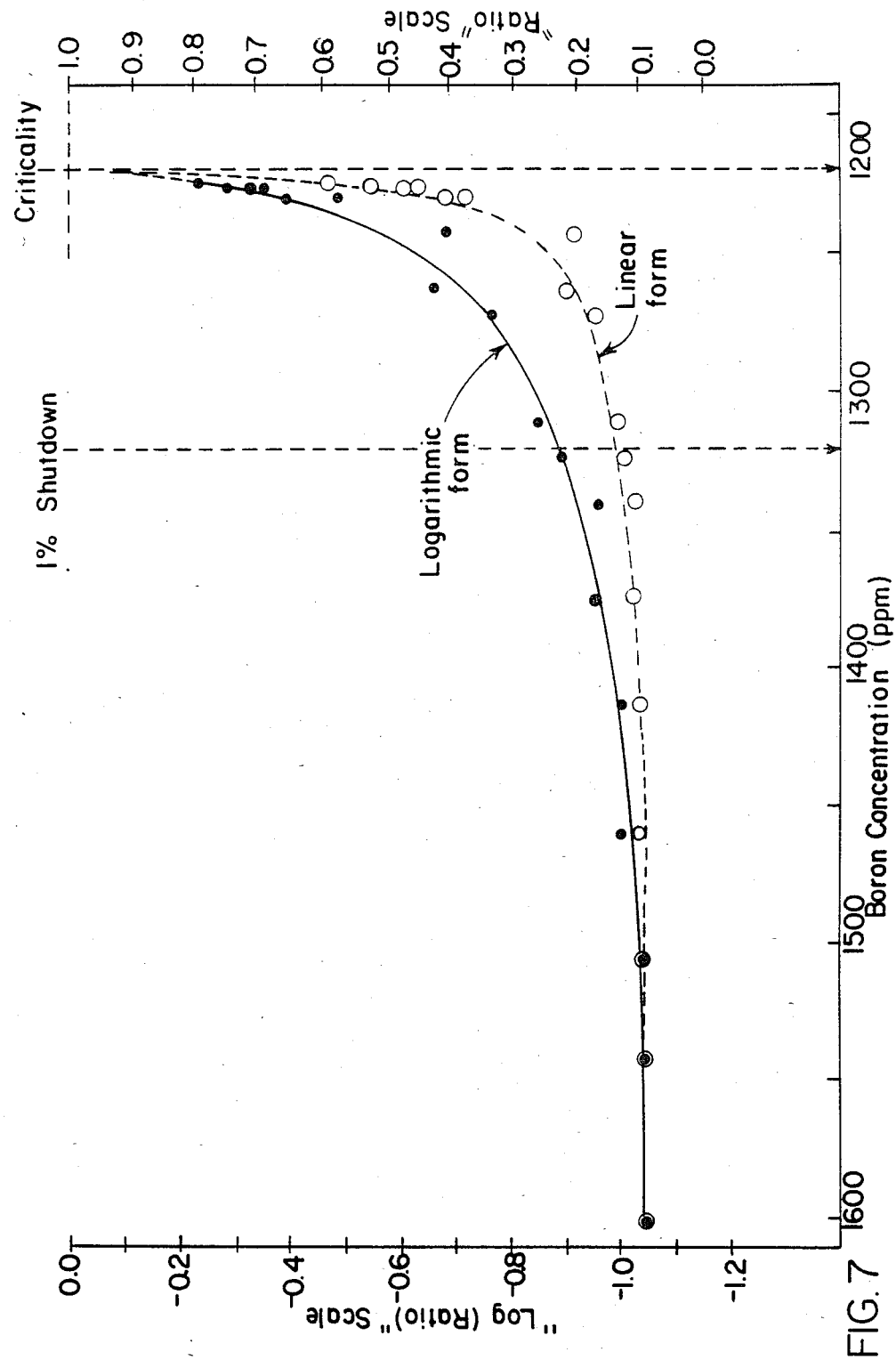
FIG. 7 is a plot showing a comparison of the ratio signals generated by the circuitry of FIGS. 5 and 6 during a dilution to criticality event.

FIG. 7 is a plot showing the changes in both the linear and log forms of the ratio signal that would be observed in accordance with the invention during a dilution to criticality operation. The data were gathered from a return to criticality after refueling in a reactor which had been shutdown for refueling and in which one source had been removed so that the configuration of the source detectors in the two channels was that called for by the invention. Both curves are unnormalized or uncalibrated in that they were generated from data which did not include the detector readings in the critical range. For purposes of comparison, the ordinates on the plot have been scaled such that the initial points on the curve are superimposed. As can be seen from the plot, a $K_{eff}$ of 0.99 (1% shutdown) was achieved at a boron concentration in the reactor coolant of between 1350 and 1300 ppm with the reactor going critical at about 1220 ppm. FIG. 7 shows that use of the log (ratio) form instead of the linear form offers the following benefits: increased sensitivity of the output parameter to changes in shutdown margin in the vicinity of 1.0 shutdown, less abrupt changes in the value of the output parameter as the core closely approaches criticality, and human engineering improvements in that the output parameter changes from a negative value toward 0.0 as the core approaches criticality while the output parameter in the linear form increases from a low positive value toward 1.0 as criticality is approached.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of determining the reactivity of the reactor fuel in the core of a nuclear reactor having an artificial neutron source within the reactor core which generates a source neutron flux in a localized region around said source which is substantially greater than the neutron flux of the reactor fuel when the core is subcritical but is negligible compared to the neutron flux of the reactor fuel when the core is critical, said method comprising:
   - generating a first electrical signal representative of the neutron flux in said localized region of the core;
   - generating a second electrical signal representative of the neutron flux in another region of the core similarly located with respect to the configuration of the reactor fuel in the core as the localized region but removed from said localized region;
   - generating from said first and second electrical signals a signal representative of the ratio between the neutron flux in said other region and the neutron flux in said localized region; and
   - generating an output signal representative of the criticality of the reactor fuel as a function of the ratio signal.

2. The method of claim 1 wherein said first and second electrical signals are generated by measuring the neutron flux at points which are external to the core of said reactor but within the neutron flux field of said reactor fuel and in the case of said first electrical signal also within the flux field of said artificial neutron source.

3. The method of claim 2 wherein said step of generating an output signal comprises comparing said ratio signal to a signal equivalent to a ratio representative of a preselected subcritical reactivity of the reactor fuel in the reactor core and generating an output signal having a first value when said ratio signal is smaller than said equivalent signal and having a second value when said ratio signal is equal to or greater than said equivalent signal.

4. The method of claim 3 wherein said preselected subcritical reactivity is equivalent to a multiplication factor of about 0.99.

5. The method of claim 2 wherein said step of generating an output signal comprises converting said ratio signal into visible indicia of the ratio.

6. The method of claim 2 wherein the step of generating said ratio signal comprises, integrating said first electrical signal with respect to time, converting the integrated first electrical signal to a first integrated logarithmic electrical signal, integrating the second electrical signal with respect to time, converting the integrated second electrical signal to a second integrated logarithmic electrical signal and subtracting the first integrated logarithmic electrical signal from the second to generate a logarithmic ratio signal.

7. The method of claim 6 wherein the step of generating an output signal comprises converting the log ratio signal into a visual indicia of the ratio.

8. Apparatus for determining the reactivity of reactor fuel in the core of a nuclear reactor, comprising:
   an artificial source of neutrons implanted in the reactor fuel which generates a neutron flux only in a localized region;
   a first neutron detector positioned to detect neutrons in the localized region from the artificial source and from the reactor fuel and to generate a first electrical signal representative of the neutron flux in said localized region;
   a second neutron detector positioned in a similar relationship to reactor fuel in the reactor core as the first neutron detector but removed from said localized region to generate a second electrical signal representative of the neutron flux generated by the natural neutron sources in the reactor fuel but not the neutron flux generated by the artificial neutron source;
   means for generating a ratio signal representative of the ratio of the second electrical signal to the first electrical signal; and
   means for generating an output signal from the ratio signal representative of the reactivity of the reactor fuel in the reactor core as a function of the ratio signal.

9. The apparatus of claim 8 wherein said first and second detectors are excore detectors located outside the reactor core.

10. The apparatus of claim 9 wherein said reactor fuel is contained in elongated rectangular fuel assemblies arranged to form a generally cylindrical core, wherein said artificial neutron source is arranged among the fuel cells with said localized region adjacent only a portion of the periphery of the generally cylindrical core, and wherein said first detector and second detector are spaced from each other angularly around the periphery of the generally cylindrical core at points where they both have the same geometric relationship to the arrangement of rectangular fuel cells, but only said first detector is adjacent said localized region.

11. The apparatus of claim 9 wherein the core of reactor fuel is generally cylindrical in shape, wherein said localized region in which the artificial neutron source generates a neutron flux is adjacent a portion of the periphery of, but extends axially only partially along the length of, said generally cylindrical core, and wherein said first and second detectors are spaced axially along said generally cylindrical core with said first detector adjacent the localized region and the second detector axially displaced from the localized region.

12. The apparatus of claim 11 wherein said first and second detectors are contained in a common excore thimble extending along the outside of the generally cylindrical core.

13. The apparatus of claim 8 wherein said means for generating an output signal comprise means for generating a reference signal representative of the value of the ratio signal for a selected subcritical core reactivity, means for comparing said ratio signal to said reference signal and means for generating a first representation when the ratio signal is less than the reference signal and for generating a second representation when the ratio signal is equal to or greater than the reference signal.

14. The apparatus of claim 8 wherein said means for generating said ratio signal comprise logarithmic integrators for generating first and second integrated logarithmic signals from said first and second electrical signals and means for subtracting said first integrated logarithmic signal from the second to generate a logarithmic ratio signal.

15. The apparatus of claim 14 including means for adding an electrical signal to said logarithmic ratio signal selected to have a value which makes the logarithmic ratio signal equal to zero when the core is critical.

* * * * *